United States Patent [19]

Wright

[11] Patent Number: 4,855,194

[45] Date of Patent: Aug. 8, 1989

[54] FUEL CELL HAVING ELECTROLYTE INVENTORY CONTROL VOLUME

[75] Inventor: Maynard K. Wright, Bethel Park, Pa.

[73] Assignee: The United States of America as represented by the United States Department of Energy, Washington, D.C.

[21] Appl. No.: 152,775

[22] Filed: Feb. 5, 1988

[51] Int. Cl.$^4$ .............................................. H01M 8/04
[52] U.S. Cl. ..................................... 429/38; 429/41; 429/44
[58] Field of Search ..................... 429/41, 44, 38, 39, 429/34, 46

[56] References Cited

U.S. PATENT DOCUMENTS

| | | | |
|---|---|---|---|
| 2,534,336 | 12/1950 | Cahoon | 429/144 |
| 3,442,712 | 5/1969 | Roberts, Jr. | 429/41 X |
| 3,519,486 | 7/1970 | Huebscher et al. | 429/41 |
| 3,905,832 | 9/1975 | Trocclola | 429/39 |
| 4,035,551 | 7/1977 | Grevstad | 429/44 |
| 4,038,463 | 7/1977 | Lamarine et al. | 429/44 |
| 4,276,356 | 6/1981 | Baker | 429/41 |
| 4,339,325 | 7/1982 | Solomon et al. | 429/42 X |
| 4,341,848 | 7/1982 | Liu et al. | 429/27 |
| 4,444,852 | 4/1984 | Liu et al. | 429/29 |
| 4,767,680 | 8/1988 | Hijikata et al. | 429/39 |

FOREIGN PATENT DOCUMENTS 45-30620 3/1970 Japan.

OTHER PUBLICATIONS

Larry Christner, Technology Development for Phosphoric Acid Fuel Cell Powerplant (Phase II), Dec. 1981, pp. 38,41,42,43,44,45,46.

Primary Examiner—Anthony Skapars

[57] ABSTRACT

A fuel cell having an electrolyte control volume includes a pair of porous opposed electrodes. A maxtrix is positioned between the pair of electrodes for containing an electrolyte. A first layer of backing paper is positioned adjacent to one of the electrodes. A portion of the paper is substantially pervious to the acceptance of the electrolyte so as to absorb electrolyte when there is an excess in the matrix and to desorb electrolyte when there is a shortage in the matrix. A second layer of backing paper is positioned adjacent to the first layer of paper and is substantially impervious to the acceptance of electrolyte.

10 Claims, 1 Drawing Sheet

FUEL CELL HAVING ELECTROLYTE INVENTORY CONTROL VOLUME

GOVERNMENT CONTRACT

The invention disclosed herein was made or conceived in the course of or under a contract with the U.S. Government identified as DE-AC21-82MC24223.

BACKGROUND OF THE INVENTION

1. Field of the Invention

The present invention is directed to fuel cells and more particularly to fuel cells having electrolyte reservoirs.

2. Description of the Prior Art

Fuel cells used to convert the latent chemical energy of a fuel directly into electricity are well-known in the art. For example, see U.S. Pat. No. 4,463,068. Such cells may be based on a variety of electrochemical reactions. One well-known reaction is based on using hydrogen as a fuel which reacts with oxygen to generate electricity.

One common form for constructing a hydrogen oxygen cell is a laminated structure wherein an anode electrode and a cathode electrode are spaced apart by a porous layer of material which holds an electrolyte such as concentrated phosphoric acid. The hydrogen is guided by passageways behind the active region of the anode and the oxygen is guided by passageways behind the active region of the cathode. Both the anode and the cathode have a catalyst, such as platinum, deposited thereon.

At the anode, the hydrogen gas dissociates into hydrogen ions plus electrons in the presence of the catalyst. The hydrogen ions migrate through the electrolyte to the cathode in a process constituting ionic current transport while the electrons travel through an external circuit to the cathode. At the cathode, the hydrogen ions, electrons, and molecules of oxygen combine to produce water.

It is known that fuel cells using phosphoric acid as an electrolyte have insufficient control volumes between the electrodes and within the matrix to compensate for acid volume expansion or upsets. Such expansion can result from operational changes of pressure, temperature, and utilization factors. The nature of phosphoric acid is such that it stays in equilibrium with the water partial pressure to which it is exposed. Therefore, any changes in the water partial pressure due to operational changes will cause water to evaporate from the acid, concentrating it and causing a volume loss, or will cause water to be absorbed by the acid, diluting it and causing a volume increase. The phosphate radical has a very low vapor pressure so its mass is constant through the postulated acid volume upsets.

Further, acid additions to cells at assembly and during lifetime may further upset the acid volume due to differing conditions between those at which acid is added and stack operating conditions. If acid is added such that an excess of the phosphate radical is taken on by the fuel cell, then at operation, excess water will be absorbed causing a further volume expansion.

Another variable in determining the right amount of acid in the fuel cell is the dimensional variation between cells in a stack. This variation can cause as much as ten percent variation in the acid volume required.

The reason that acid expansion is a problem is that the electrode catalyst layers with the matrix between them depend on gas diffusion for the process gases to reach the catalyst sites while the acid must also be present for the electrochemical reaction to occur. If there is too much acid, flooding of the electrodes can occur causing a loss o gas diffusion capability and therefore a loss of cell performance.

The prior art has attempted to solve this generic problem by providing an inventory control volume capable of absorbing electrolyte during periods of electrolyte expansion and desorbing electrolyte during periods of electrolyte contraction. One fuel cell having such a reservoir is disclosed in U.S. Pat. No. 4,038,463. An electrolyte reservoir layer, which is porous and hydrophilic to the electrolyte, is disposed behind and adjacent to one of the catalyst layers of the fuel cell. In one embodiment, the reservoir includes impregnations of hydrophobic material to provide reactant gas passages through the reservoir layer to the catalyst layer. The impregnations of hydrophobic material are designed to provide good distribution of the reactant gas into the catalyst layer without consuming a large volume of the reservoir. Additionally, the reservoir layer includes impregnations of a material similar to the electrolyte retaining matrix material to improve electrolyte transfer from the matrix into the reservoir. Although such a construction does provide for an electrolyte inventory control volume, it substantially complicates the production of the fuel cell. It is difficult to manufacture a reservoir layer having such discrete hydrophobic and hydrophilic areas together with areas impregnated with other materials. Such difficult manufacturing procedures also increase the cost of the fuel cell.

Another attempt at providing an electrolyte reservoir is disclosed in U.S. Pat. No. 4,035,551. In that reference an electrolyte reservoir layer is disposed behind and adjacent to one of the catalyst layers of a fuel cell. The reservoir layer is a porous hydrophilic material. Excess liquid volume wicks into the reservoir layer through the catalyst layer and fills the smaller pores within the reservoir. The larger pores remain empty and provide clear passageways for the reactant gas to reach the catalyst. Such an embodiment requires precise control over the production of the reservoir layer to insure that the reservoir layer has the proper number and positioning of small and large pores. This again adds to the cost of the production of the fuel cell.

Accordingly, there is a need for a fuel cell having an electrolyte inventory control volume which is capable of being manufactured easily and inexpensively.

SUMMARY OF THE PRESENT INVENTION

The present invention is directed to a fuel cell having an electrolyte control volume. The fuel cell is comprised of a pair of porous opposed electrodes. A matrix is positioned between the pair of electrodes for containing an electrolyte. A first layer of backing paper is positioned adjacent to one of the electrodes. A portion of the paper is substantially pervious to the acceptance of electrolyte so as to absorb electrolyte when there is an excess in the matrix and to desorb electrolyte when there is a shortage in the matrix. The remainder of the paper is impervious to the acceptance of electrolyte to provide gas flow passages The second layer of backing paper is positioned adjacent to the first layer of paper and is substantially impervious to the acceptance of the electrolyte.

The present invention, by virtue of the first layer of backing paper, provides an electrolyte control volume.

The portion of the first layer of backing paper which is pervious to the acceptance of electrolyte may include about fifty percent of the paper. The paper is selected to have a thickness which enables the paper to provide an acid control volume which is about ten percent of the volume of the matrix acid volume. Such a volume is sufficient to prevent the electrodes from being flooded during periods of volume expansion.

Because the backing for the electrode is comprised of two discrete layers, manufacturing of the control volume is substantially simplified. The first layer of backing paper can be easily masked so that the remaining portion can be wet-proofed thereby providing areas which are substantially impervious to the acceptance of electrolyte. A second layer of backing paper is completely wet-proofed so as to retain the electrolyte within the cell. Such manufacturing processes are easy to control in that the depth of wet-proofing is not a concern with the present invention. By simplifying the manufacturing process, the overall cost of the fuel cell can be reduced and the manufacturing variability of the control volume reduced. These and other advantages and benefits of the present invention will be apparent from the description of a preferred embodiment hereinbelow.

BRIEF DESCRIPTION OF THE DRAWINGS

In order that the present invention may be clearly understood and readily practiced, a preferred embodiment will now be described, by way of example only, with reference to the accompanying figures wherein.

DESCRIPTION OF A PREFERRED EMBODIMENT

Figure 1:
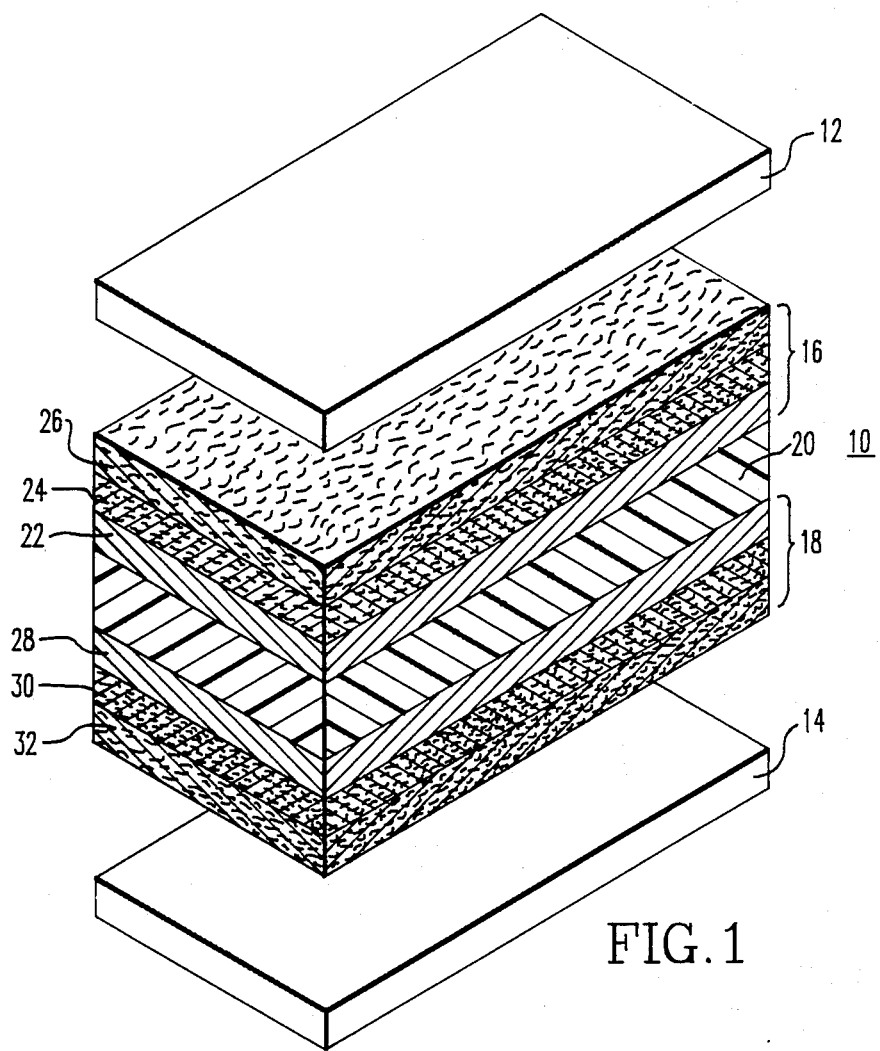
FIG. 1 is a partially exploded view of a fuel cell constructed according to the teachings of the present invention.

A fuel cell 10 constructed according to the teachings of the present invention is illustrated in FIG. 1. The fuel cell 10 is comprised of a top bipolar plate 12 and a bottom bipolar plate 14. Sandwiched between the plates 12 and 14 is a cathode electrode 16 and an anode electrode 18. Between the electrodes 16 and 18 is a matrix 20. The matrix 20 contains an electrolyte which may be, for example, phosphoric acid.

The cathode 16 is comprised of a cathode layer 22, a first layer of backing paper 24, and second layer of backing paper 26. Similarly, he anode 18 is comprised of an anode layer 28, a first layer of backing paper 30 and a second layer of backing paper 32.

An ideal place to store electrolyte is in the first layer of anode backing paper 30 and to a lessor degree in the first layer of the cathode backing paper 24. However, the provisions for storage of electrolyte must not interfere with gas diffusion through the layers of backing paper 30, 24 and into the electrode layers 28 and 22, respectively.

Current fuel cell designs have a layer of backing paper which is approximately 16 mils (0.406 mm) thick. If two sheets of such 16 mil paper would be provided for the layers of backing paper 30 and 32, then cell resistance and diffusion losses would increase thereby leading to undesirable cell performance. Therefore, it is desirable to use backing paper for the first and second layers 30 and 32, respectively, such that the combined thickness approximates the thickness of currently used backing paper. Backing papers having thicknesses of 4 mils (0.102 mm), 8 mils (0.203 mm), 12 mils (0.305 mm) and 16 mils (0.406 mm) are currently available. By taking such papers in combinations of 4 mils and 12 mils or two 8 mil sheets, the 16 mil total thickness can be retained.

A key feature of the present invention is that the second layers of backing paper 26, 32 can be fully wet-proofed to keep the electrolyte essentially within the cell and essentially away from top and bottom plates 12 and 14, respectively. The first layers of backing paper 24, 30 which are next to the electrode layers 22, 28, respectively, can be differentially wet-proofed in a pattern such that a portion of the backing paper is wet-proofed through its entire thickness to ensure gas diffusion while the remainder of the backing paper is not wet-proofed to allow spaces for the electrolyte to freely expand without the resistance caused by the wet-proofing. With such a configuration, as electrolyte volume changes, the non-wet-proofed portions of the first layer of backing paper 30 can accept electrolyte or allow electrolyte to feed back to the matrix as the dynamics of the process warrants. During periods of electrolyte expansion, the non-wet-proofed portions would absorb excess electrolyte while during periods of electrolyte shortages, the non-wet-proofed portions would desorb electrolyte. It is essential that the electrolyte be able to freely move into and out of the non-wet-proofed portions in preference to the wet-proofed portions of the first layer of backing paper 30. Without such a preference, the electrolyte forces itself through the electrodes 22, 28 and first layers of backing paper 24, 30 and interferes with gas diffusion to the catalyst layer thus causing a degree of flooding.

In addition to providing a control volume to compensate for expansions and contractions in the electrolyte volume, the non-wet-proofed areas of the first layer of backing paper 30 can also act as a reservoir for acid make-up to extend endurance times between acid additions.

Figure 2:
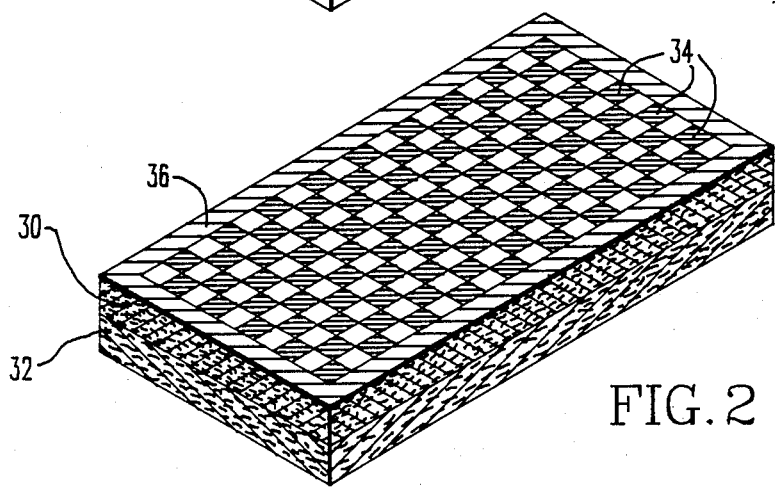
FIG. 2 illustrates the pattern of wet-proofed areas on the first layer of backing paper.

Another feature of the present invention lies in the amount of the first layer of backing paper which is wet-proofed. Although quantitative studies have not yet been performed, it is believed that the non-wet-proofed portions of the first layer of backing paper should be limited to less than 50% for the first layer of backing paper 30 for the anode electrode 18 and 25% of the first layer of backing paper 24 for the cathode electrode 16 so as not to interfere with gas diffusion of hydrogen through the anode electrode 18 and oxygen through the cathode electrode 16. FIG. 2 illustrates how such differential wet-proofing might appear.

In FIG. 2, the wet-proofed areas are indicated by reference numerals 34 and 36. Although the precise wet-proofed area shape should not be critical, uniformly alternating areas of wet-proofed and non-wet-proofed portions and the maximum dimension of the non-wet-proofed portion are critical in order to minimize the gas diffusion losses from the process gas channels to the catalyst layer through the backing paper. Gas diffusion paths of 0.15 inch (0.381 cms) or less through the catalyst layer adjacent to the non-wet-proofed portions are practical for processing and are believed acceptable for cell performance. The edge 36 of the first layer of backing paper 30 is completely wet-proofed to keep the electrolyte within the fuel cell. It is believed that such a pattern of preferential wet-proofing such as that used on the first layers of backing paper 24, 30 is substantially easy to achieve since the wet-proofed areas extend through the entire thickness of the paper. A simple masking technique can be used to designate the non-wet-proofed portions. The second layers of backing paper 26, 32 are completely wet-proofed through their entire thickness to ensure that the electrolyte does not leak from the fuel cell. Such complete wet-proofing is routinely accomplished in the prior art. Therefore, the fuel cell of the present invention incorporates an electrolyte inventory control volume which is easy and inexpensive to manufacture.

Sample calculations with the thickness of papers identified above, compressed, and with 50% volume available to accept electrolyte, yielded the following results:

| Compressed Paper Thickness (in.) | Acid Volume (cc/in2) | Excess Volume for Expansion |
|---|---|---|
| .0089 | .015 | 5% |
| .0135 | .024 | 10% |
| .0180 | .035 | 15% |

The dimensional variations in fuel cell components requiring electrolyte indicate that a 10% capacity is required. Therefore, the 13.5 mil (0.343 mm) paper with a differential wet-proofing pattern as shown in FIG. 2 in combination with a fully wet-proofed 4 mil (0.102 mm) paper or 8.9 mil (0.226 mm) paper would provide appropriate first and second layers of backing paper, respectively, for the anode layer 28. In addition, the total control volume could be increased by about 50% if a similar feature were added to the cathode electrode 16.

In order to preserve the control space in the backing paper for expansion, the procedure for adding acid may need to be revised. Acid of a lower concentration than normal, for example 85%, would be added at assembly and during periods of acid addition. At start-up and during operation, such acid would concentrate to its equilibrium value of 97% by giving up water. By giving up water, and shrinking, the control volume space provided in one or both of the electrodes would be available to absorb electrolyte during periods of electrolyte volume expansion.

While the present invention has been described in connection with an exemplary embodiment thereof, it will be understood that many modifications and variations will be readily apparent to those of ordinary skill in the art. This disclosure and the following claims are intended to cover all such modifications and variations.

I claim as my invention:

1. A fuel cell having an electrolyte control volume, comprising:
   a pair of porous opposed electrodes;
   matrix means positioned between said pair of electrodes for containing an electrolyte;
   first means for backing positioned adjacent to one of said electrodes, a portion of said means for backing being substantially pervious to the acceptance of electrolyte so as to absorb electrolyte when there is an excess in said matrix means and to desorb electrolyte when there is a shortage in said matrix means; and
   second means for backing positioned adjacent to said first means for backing and being substantially impervious to the acceptance of electrolyte.

2. The fuel cell of claim 1 wherein one of said electrodes is a cathode and one of said electrodes is an anode, and wherein said first and second means for backing include first and second layers of backing paper positioned adjacent to said anode.

3. The fuel cell of claim 2 wherein said portion of said first layer of paper being substantially pervious to the acceptance of electrolyte includes no more than about 50% of said paper.

4. The fuel cell of claim 3 additionally comprising a first layer of backing paper positioned adjacent to said cathode, a portion of said paper being substantially pervious to the acceptance of electrolyte so as to be capable of absorbing and desorbing electrolyte, and a second layer of backing paper positioned adjacent to said first layer of paper and being substantially impervious to the acceptance of electrolyte.

5. The fuel cell of claim 4 wherein said portion of said first layer of paper adjacent to said cathode being substantially pervious to the acceptance of electrolyte includes no more than about 25% of said paper.

6. The fuel cell of claim 1 wherein said portion of said first means for backing being substantially pervious to the acceptance of electrolyte includes a portion having about 10% of the capacity of said matrix means for electrolyte.

7. The fuel cell of claim 1 wherein said first and second means for backing have a combined thickness of about 16 mils.

8. The fuel cell of claim 1 wherein said first means for backing has a thickness of about 13.5 mils and said second means for backing has a thickness of about 4 mils.

9. The fuel cell of claim 1 wherein the electrolyte initially includes under concentrated phosphoric acid.

10. A stack of fuel cells each having an electrolyte control volume, said stack comprising,
    a plurality of individual fuel cells, each including,
      a pair of porous opposed electrodes;
      matrix means positioned between said pair of electrodes for containing an electrolyte;
      a first layer of backing paper positioned adjacent to one of said electrodes, a portion of said paper being substantially pervious to the acceptance of electrolyte so as to absorb electrolyte when there is an excess in the matrix and to desorb electrolyte when there is a shortage in the matrix; and
      a second layer of backing paper positioned adjacent to said first layer of paper and being substantially impervious to the acceptance of electrolyte.

* * * * *